(12) United States Patent
Bertrand et al.

(10) Patent No.: US 8,940,817 B2
(45) Date of Patent: Jan. 27, 2015

(54) METHOD FOR PREPARING AN ACTINIDE(S) OXALATE AND FOR PREPARING AN ACTINIDE(S) COMPOUND

(75) Inventors: Murielle Bertrand, Uzes (FR); Stephane Grandjean, Saint Marcel de Careiret (FR); Bruno Courtaud, Bellac (FR); Frederic Auger, Boisseuil (FR)

(73) Assignees: Commissariat a l'Energie Atomique et aux Energies Alternatives, Paris (FR); Areva NC, Paris (FR)

( * ) Notice: Subject to any disclaimer, the term of this patent is extended or adjusted under 35 U.S.C. 154(b) by 46 days.

(21) Appl. No.: 13/139,704

(22) PCT Filed: Dec. 17, 2009

(86) PCT No.: PCT/EP2009/067443
§ 371 (c)(1),
(2), (4) Date: Jun. 14, 2011

(87) PCT Pub. No.: WO2010/070064
PCT Pub. Date: Jun. 24, 2010

(65) Prior Publication Data
US 2011/0263837 A1    Oct. 27, 2011

(30) Foreign Application Priority Data
Dec. 19, 2008  (FR) ..................................... 08 58860

(51) Int. Cl.
| | | |
|---|---|---|
| C07F 5/00 | (2006.01) | |
| C01G 56/00 | (2006.01) | |
| C01G 43/025 | (2006.01) | |
| G21C 3/62 | (2006.01) | |
| G21C 19/46 | (2006.01) | |

(52) U.S. Cl.
CPC ............. *C01G 56/00* (2013.01); *C01G 43/025* (2013.01); *G21C 3/62* (2013.01); *G21C 3/623* (2013.01); *G21C 19/46* (2013.01); *C01P 2400/03* (2013.01); *C01P 2400/51* (2013.01); *Y02E 30/38* (2013.01)
USPC .......................................................... 524/13

(58) Field of Classification Search
USPC .................................................... 534/16, 13
See application file for complete search history.

(56) References Cited

U.S. PATENT DOCUMENTS

| | | | |
|---|---|---|---|
| 3,264,070 A | * | 8/1966 | Devabhaktuni Ramaswami et al. ............................... 423/19 |
| 4,636,367 A | * | 1/1987 | Huck et al. ...................... 423/12 |
| 7,829,043 B2 | | 11/2010 | Grandjean et al. |
| 2005/0288542 A1 | * | 12/2005 | Grandjean et al. ............ 588/313 |

FOREIGN PATENT DOCUMENTS

| | | |
|---|---|---|
| FR | 2870841 | 12/2005 |
| WO | WO 2005/119699 | 12/2005 |

OTHER PUBLICATIONS

Vandegrift, Chemical Technology Division, Argonne National Laboratory, Dec. 2000.*
Lewis, A. E., "Fines Formation (and Prevention) in Seeded Precipitation Processes," KONA, vol. 24, 2006, pp. 119-125.
Van Hille, R. P., "Copper Sulphide Precipitation in a Fluidised Bed Reactor," Chemical Engineering Science, vol. 60, 2005, pp. 2571-2578.
Seckler, M. M. et al, "Phosphate Removal in a Fluidized Bed—I. Identification of Physical Processes," Wat. Res., vol. 30, No. 7, 1996, pp. 1585-1588.
Van Ammers, M. et al., "State of the Art of Pellet Softening in the Netherlands," Wat. Supply, vol. 4, 1986, pp. 223-235.
Scholler, M. et al., "Recovery of Heavy Metals by Crystallization in the Pellet Reactor," Proceedings of the Second Conference on Environmental Technology, Production and the Environment, British Library, 2007, pp. 294-303.
Nielsen, P. B. et al., "Continuous Removal of Heavy Metals From FGD Wastewater in a Fluidised Bed Without Sludge Generation," Wat. Sci. Tech., vol. 36, No. 2-3, 1997, pp. 391-397.
Zhou, P. et al., "Heavy Metal Removal From Wastewater in Fluidized Bed Reactor," Wat. Res., vol. 33, No. 8, 1999, pp. 1918-1924.
Frances, C. et al., "Modelling of a Continuous Fluidized-Bed Crystallizer, Effects of Mixing and Segregation on Crystal Size Distribution During the Crystallization of Tetrahydrate Sodium Perborate," Chemical Engineering Science, vol. 49, No. 19, 1994, pp. 3269-3276.
French Search Report in French Application No. FR 0858860, dated Jul. 31, 2009.
International Search Report and Written Opinion in International Application No. PCT/EP2009/067443, mailed Feb. 1, 2010.
International Preliminary Report on Patentability in International Application No. PCT/EP2009/067443, mailed Apr. 1, 2011.

* cited by examiner

*Primary Examiner* — Michael G Hartley
*Assistant Examiner* — Robert Cabral
(74) *Attorney, Agent, or Firm* — Nixon Peabody LLP

(57) ABSTRACT

A method for preparing an oxalate of one or more actinides for processing and recycling nuclear fuel, comprising: the precipitation of said actinide or the coprecipitation of said actinides in the form of oxalate particles by bringing into contact an aqueous solution containing the actinide(s) with an aqueous solution of oxalic acid or of an oxalic acid salt; and the collection of the resulting oxalate particles; characterized in that the precipitation or coprecipitation is carried out in fluidized bed.

16 Claims, 3 Drawing Sheets

METHOD FOR PREPARING AN ACTINIDE(S) OXALATE AND FOR PREPARING AN ACTINIDE(S) COMPOUND

CROSS REFERENCE TO RELATED APPLICATIONS OR PRIORITY CLAIM

This application is a National Phase of PCT/EP2009/067443, filed Dec. 17, 2009, entitled, "METHODS FOR PREPARING AN ACTINIDE OXALATE AND FOR PREPARING AN ACTINIDE COMPOUND", and which claims priority of, French Patent Application No. 08 58860, filed Dec. 19, 2008, the contents of which are incorporated herein by reference in their entirety.

TECHNICAL FIELD

The present invention relates to a method for preparing an actinide(s) oxalate.

It also relates to a method for preparing an actinide(s) compound and, in particular, an actinide(s) oxide, carbide or nitride using said method.

The invention makes it possible to obtain powders of simple or mixed actinides oxalates provided with remarkable properties, particularly as regards their aptitude to be handled, to be filtered and to be poured, and, from said oxalate powders, powders of simple or mixed actinides compounds that have said same properties.

The invention finds application in the field of processing and recycling of spent nuclear fuels where it has a quite particular interest for the preparation of actinides compounds suited to serving in the manufacture of nuclear fuel pellets of oxide, carbide or nitride type and, more specially, of mixed actinide oxides.

These mixed actinides oxides may in particular be mixed oxides of uranium and of plutonium with if appropriate neptunium ($(U,Pu)O_2$ or $(U,Pu,Np)O_2$), mixed oxides of uranium and of americium with if appropriate curium ($(U,Am)O_2$ or $(U,Am,Cm)O_2$), mixed oxides of uranium and of curium ($(U,Cm)O_2$), or instead mixed oxides of uranium, of plutonium and of americium with if appropriate curium ($(U,Pu,Am)O_2$ or $(U,Pu,Am,Cm)O_2$) and/or neptunium ($(U,Pu,Np,Am)O_2$ or $(U,Pu,Np,Am,Cm)O_2$).

STATE OF THE PRIOR ART

The nuclear fuel cycle as implemented by AREVA NC in France includes steps that consist in converting uranyl nitrate and plutonium nitrate into oxides that are then used to manufacture nuclear fuel pellets and, in particular, MOX fuels.

In this way are produced uranium oxide $UO_2$, plutonium oxide $PuO_2$ and mixed oxides of uranium and of plutonium $(U,Pu)O_2$. In the latter case, this is known as coconversion.

The (co)conversions of uranyl nitrate and plutonium nitrate are currently achieved by methods that are all based on a same principle, namely that uranium, plutonium or these two elements are firstly (co)precipitated in the form of an insoluble salt by bringing into contact one of these nitrates or a mixture of the two with a precipitation agent then the resulting (co)precipitate is, after filtration, washing and spinning, calcinated to be transformed into an oxide.

For the preparation of uranium oxide, the precipitation agent is typically aqueous ammonia so that the uranium precipitates in the form of ammonium uranate, which leads by calcination to uranium sesquioxide $U_3O_8$, which is then reduced into $UO_2$.

For the preparation of plutonium oxide or a mixed oxide of uranium and plutonium, the precipitation agent is typically oxalic acid so that the (co)precipitate obtained is an oxalate.

In all cases, it is essential that the (co)conversion method used leads to obtaining an oxide powder that has characteristics compatible with use in the different operations used during the manufacture of nuclear fuel pellets.

In particular, said powder must be easy to handle, have a good aptitude to filtration and flow. Moreover, it is desirable that it generates the least possible dust to avoid disseminating radioactive materials in the confined enclosures in which the nuclear fuel pellets are manufactured and reduce the risks of external contamination in the event of rupture of confinement.

It is thus important that the (co)precipitates from which the $UO_2$, $PuO_2$ and $(U,Pu)O_2$ powders are obtained have, themselves, such characteristics and that consequently the granulometric and morphological aspects resulting from interactions between the processes of nucleation, crystalline growth, agglomeration and splintering that occur during (co)precipitation are taken into account during the preparation of said (co)precipitates.

Precipitating actinides is traditionally carried out in stirred reactors. However, the use of this type of reactor leads to precipitates being obtained that have a dispersed granulometric distribution, with the presence of very fine dust generating particles.

Precipitation in a rotating disc reactor generally makes it possible to obtain precipitates with narrower granulometric distribution but poses problems of scaling and accumulation of materials due to the large diameter of the disc. Optimisation studies are thus necessary to limit as best as possible the deposits of crystals on the walls in what is known as the nucleation zone which these reactors comprise. The problems of scaling are all the more acute in the case of actinide oxalates given that the nuclei that form are particularly sticky. In certain adaptations of this technology, the disc is replaced by a Rushton turbine, which leads to increasing the shear rate. The problems of scaling may then prove to be less important but to the detriment of the granulometry due to attrition phenomena.

Precipitation in Vortex effect reactor does not have these drawbacks. This type of reactor is moreover employed with success in the nuclear industry for the oxalic precipitation of plutonium. Having said that, it does not represent an entirely satisfactory solution in so far as the production capacity of (co)precipitates of actinides in Vortex effect reactor is limited for reasons of criticality.

Yet, in the perspective of building new plants for processing spent nuclear fuels in which it is envisaged to produce fluxes containing several purified actinides, amenable to beneficiation into mixed actinide oxides, carbides or nitrides, it would be desirable to have available a method that makes it possible to produce actinides oxalates and, in particular, mixed oxalates at high rates.

Furthermore, it would be desirable that this method makes it possible to obtain actinides oxalates in the form of powders, the granulometric and morphological characteristics of which and, consequently, the properties of handleability, filterability and flowability are, if possible, even more interesting than those presented by actinides oxalate powders prepared in Vortex effect reactor.

The Inventors have thus set themselves the aim of providing such a method.

DESCRIPTION OF THE INVENTION

This aim is attained by the invention which proposes, in the first instance, a method for preparing an oxalate of one or more actinides, which comprises:

the precipitation of said actinide or the coprecipitation of said actinides in the form of oxalate particles by bringing into contact an aqueous solution containing the actinide(s) with an aqueous solution of oxalic acid or of an oxalic acid salt; and the collection of the resulting oxalate particles;

and which is characterised in that the precipitation or coprecipitation is carried out in fluidised bed.

For reasons of simplicity, the term "(co)precipitation" serves to designate, in what precedes and follows, a precipitation or a coprecipitation, whereas the term "(co)precipitate" serves to designate a precipitate or a coprecipitate.

In a similar manner, the term "(co)conversion" serves to designate, in what precedes and follows, a conversion or a co-conversion.

Furthermore, the expressions "solution of actinide(s)" and "oxalic solution" serve to designate respectively, in what follows, the aforementioned aqueous solution containing the actinide(s) and the aqueous solution of oxalic acid or of oxalic acid salt.

It is recalled that precipitation in fluidised bed is a precipitation technique known to those skilled in the art. Indeed, its use has already been described in the literature to precipitate a certain number of salts such as calcium, nickel, zinc, lead or copper carbonates (see for example, Van Ammers et al., Wat. Supply, 1986, 4, pp 223-235; Schöller et al. 1987, Proceedings of the Second Conference on Environmental Technology, Production and the Environment, pp 294-303; Nielsen et al. 1997, Water Sci. Techno., 36, pp 391-397; Zhou et al. 1999, Water Research, 33(8), pp 1918-1924), calcium, iron or zinc phosphates (see, for example, Seckler et al. 1996, Water Research, 30(7), pp 1585-1596), sulphur or copper or instead sodium perborate tetrahydrate (Frances et al. 1994, Chemical Engineering Science, 49(19), pp 3269-3276).

The reader may thus, if necessary, refer to these documents to learn the principle of this technique and its different implementation methods.

According to the invention, the solution of actinide(s) typically has a total concentration of actinide(s) of 0.01 to 300 g/L and, preferably, of 10 to 100 g/L whereas the oxalic solution typically has a concentration of oxalic acid or oxalic acid salt of 0.05 to 1 mole/L and, preferably, of 0.4 to 0.8 mole/L.

The volume ratio of the solution of actinide(s) to the oxalic solution is preferentially chosen so that the oxalic acid or oxalic acid salt is in excess compared to the stoichiometric conditions of the precipitation reaction of the actinide or actinides, this excess being, preferably, from 0.01 to 0.5 mole/L and, better still, from 0.05 to 0.2 mole/L.

Preferably, the aqueous solution of actinide(s) contains the actinide(s) in the form of nitrate(s), since it is in this form that these elements are generally produced by spent nuclear fuel processing plants.

Furthermore, the solution of actinide(s) is preferentially an acid solution and, more specially, a nitric acid solution, in which case it contains generally from 0.1 to 4 moles/L and, better still, from 1 to 2 moles/L of nitric acid.

This solution and/or the oxalic solution may contain in addition a monocharged cation, which is constituted uniquely of atoms of oxygen, carbon, nitrogen and hydrogen, and which is capable of favouring the formation of a homogeneous actinide oxalate, particularly (but not necessarily) by stabilising this or these actinide(s) at the oxidation state in which they are initially present in said solution.

The use of such a cation, which has a quite particular interest when it is wished to coprecipitate several actinides of which one at least is in the oxidation state IV whereas another of said actinides is in the oxidation state III—which is, for example, the case for the preparation of a mixed oxalate of uranium(IV) and of plutonium(III) or of a mixed oxalate of uranium(IV) and of americium(III)—is described in detail in the international application PCT published under the number WO 2005/119699.

If the monocharged cation has the vocation of stabilising the actinide(s) in their oxidation state and, in particular, in the IV and III oxidation states respectively, then said cation is present in the aqueous solution containing this or these actinide(s) and is, preferably, chosen from the hydrazinium ion and hydrazinium ions comprising one or more alkyl groups, the most preferred ion of all being the hydrazinium ion.

In which case, said hydrazinium ion is advantageously provided by the presence of hydrazinium nitrate in the solution of actinide(s), for example at a concentration of 0.01 to 0.2 mole/L, said hydrazinium nitrate being obtained beforehand by reacting nitric acid with hydrazine, pure or diluted in water.

If the monocharged cation is not specially destined to stabilise the actinide(s) in their oxidation state, then said cation may be present in one or the other of the solution of actinide(s) and the oxalic solution and is, preferably, chosen from the ammonium ion and substituted ammonium ions such as alkylammonium ions, more particularly from quaternary substituted ammonium ions such as tetraalkylammonium ions, the most preferred ion of all being the ammonium ion.

In which case, said ammonium ion may be provided either by the presence of aqueous ammonia in the solution of actinide(s), or by carrying out the coprecipitation by means of an aqueous ammonium oxalate solution.

The method according to the invention is, preferably, used in a fluidised bed reactor which, being of vertical main axis, comprises:

an intermediate part allocated to the fluidisation of particles of (co)precipitate, in other words actinide(s) oxalate;

an upper part allocated to the decantation of particles of (co)precipitate; and a lower part allocated to the sedimentation of particles of (co)precipitate.

In which case, the method comprises:

the bringing into contact, in the fluidised bed reactor, of the solution of actinide(s) with the oxalic solution by introducing said solutions into said reactor, one at least of said solutions being introduced into the lower part of the reactor so as to create an ascending current of liquid; as a result of which, a fluidised bed of particles of (co)precipitate is formed in the intermediate part of the reactor;

the decantation of the particles of (co)precipitate in the upper part of the reactor; as a result of which, two phases are formed, namely a solid phase constituted of the particles of (co)precipitate and a liquid phase which corresponds to the mixing of the aqueous solutions introduced into the reactor but which is depleted into actinide(s) and into oxalic acid or oxalic acid salt; and the sedimentation of particles of (co)precipitate in the lower part of the reactor.

According to the invention, the formation of particles of (co)precipitate in the fluidised bed reactor results uniquely from bringing into contact, in said reactor, the solution of actinide(s) and the oxalic solution.

Nevertheless, it is also possible to facilitate the formation of this (co)precipitate by injecting into the reactor, simultaneously with its filling with solution of actinide(s) and with oxalic solution or at the end of this filling, a suspension of fine actinide(s) oxide particles—in other words particles having typically a size of 5 to 20 µm—which are going to play the role of seeds (or nuclei).

These seeding particles will most usually be particles having been obtained previously by a conventional "batch" method of precipitation in reactor, dried and stored with a view to their subsequent use as seeds.

Nevertheless, they may also be particles that are obtained during the preparation of an actinide(s) oxalate by the method according to the invention, for example by supplying, with solution of actinide(s) and oxalic solution, a (co)precipitation vessel which is independent of the fluidised bed reactor but which is connected to it by a pipe, advantageously provided with a pump, suited to enabling the transfer, at a selected rate, of said particles into said reactor.

Furthermore, it is entirely possible, according to the invention, to provide that the finest particles of (co)precipitate—in other words, in practice, those that measure less than 10 µm—present in the upper part of the fluidised bed reactor are withdrawn and transferred into the lower part of said reactor during the (co)precipitation. This is then termed "recycling loop".

This method of implementation is besides that which is preferred in the case of the preparation of a mixed oxalate such as a mixed oxalate of uranium(IV) and of plutonium(III) or a mixed oxalate of uranium(IV) and of americium(III).

In all cases, the (co)precipitation may be carried out at a temperature ranging from 10 to 80° C., this temperature being that which reigns in the fluidised bed reactor. An ideal temperature is typically of the order of 20 to 35° C.

Although the actinide(s) from which it is wished to prepare an oxalate may, according to the invention, be chosen from all known actinides, it is typically uranium, plutonium, neptunium, thorium, americium and/or curium.

In particular, it is uranium, plutonium, neptunium, americium and/or curium that it is wished to obtain in the form of a simple or mixed oxalate suited to being transformed secondarily into an actinide compound useful for the manufacture of nuclear fuel pellets, of the oxide, carbide or nitride type.

Such an oxalate is advantageously a mixed oxalate, in which case it is, preferably, an oxalate of uranium(IV) and of plutonium(III), an oxalate of uranium(IV) and of americium (III), an oxalate of uranium(IV) and of curium(III), an oxalate of uranium(IV), of plutonium(III) and of neptunium(IV), an oxalate of uranium(IV), of plutonium(III) and of americium (III), an oxalate of uranium(IV), of americium(III) and of curium(III), an oxalate of uranium(IV), of plutonium (III), of americium(III) and of curium(III) or instead an oxalate of uranium(IV), of plutonium(III), of neptunium(V), of americium(III) and of curium(III) from which may be produced respectively the mixed oxides $(U,Pu)O_2$, $(U,Am)O_2$, $(U,Cm)O_2$, $(U,Pu,Np)O_2$, $(U,Pu,Am)O_2$, $(U,Am,Cm)O_2$, $(U,Pu,Am,Cm)O_2$ and $(U,Pu,Np,Am,Cm)O_2$.

Among these oxalates, preference is given to the oxalates of uranium(IV) and of plutonium(III), to the oxalates of uranium(IV) and of americium(III), as well as to the oxalates of uranium(IV), of plutonium(III) and of americium(III).

In this respect, it goes without saying that, in the case where the method according to the invention is used to prepare a mixed actinides oxalate which is intended to be transformed then into mixed oxide, the respective proportions of the actinides in the aqueous solution that is brought into contact with the oxalic solution are chosen as a function of the proportions in which these actinides must be found in the mixed oxide and the precipitation yield obtained for each of them.

As mentioned previously, the method according to the invention also comprises collecting the particles of (co)precipitate, which is typically carried out by decanting off the particles having sedimented in the lower part of the fluidised bed reactor. This collection may be followed by solid-liquid separation operations of the filtration, centrifugation or analogous type, to remove the particles of (co)precipitate from the liquid phase likely to have been decanted with them, as well as operations of washing and/or drying.

The method for preparing an actinide(s) oxalate according to the invention has numerous advantages.

Indeed, it makes it possible to obtain powders of simple or mixed actinides oxalates which are constituted of spherical or quasi spherical particles (as may be seen in appended FIGS. 3A and 3B), of average size greater than the average size of particles of actinides oxalates obtained to date (including those obtain in Vortex effect reactors), and which have a narrow and controlled granulometry, exempt of easily dispersible fine particles.

It ensues that these powders have remarkable properties of filterability and flowability, their flowability after drying being, in fact, comparable to that of dry sand.

It also ensues that these powders are easy to handle and do not generate dust, thus reducing the risks of dissemination and contamination in the event of rupture of confinement.

Furthermore, the use of a fluidised bed having, among other advantages, that of offering a large contact surface between the liquid and solid phases, the method according to the invention makes it possible in addition to prepare actinides oxalate powders at high rates while using fluidised bed reactors of reduced dimensions, which is particularly interesting in terms of managing risks of criticality.

In addition, since a fluidised bed can be used according to very varied methods, the method according to the invention has great flexibility of use with the possibility of perfectly adapting said method as a function of the actinide or actinides from which it is wished to obtain an oxalate and the use for which said oxalate is intended and, thus, the characteristics of size, composition or other that it has to have.

Moreover, the problems of scaling and accumulation of materials encountered during the use of certain types of reactor, such as rotating disc reactors, do not exist with fluidised bed reactors, which are easy to empty and to clean, which makes it possible to simplify maintenance operations.

The method according to the invention is thus particularly adapted to the preparation of actinides oxalates intended to be transformed secondarily into actinides compounds suited to serving in the manufacture of nuclear fuel pellets, of the oxide, carbide or nitride type.

Another object of the invention is a method for preparing an actinide(s) compound of the oxide, carbide or nitride type, which comprises:
 the preparation of an oxalate of one or more actinides by a method as defined previously; and
 the calcination of this oxalate.

The calcination of actinides oxalates into actinides oxides, carbides and nitrides is well known to those skilled in the art.

It is thus simply recalled that it is generally carried out at temperature and under an atmosphere that may be oxidising, inert or reducing depending on whether it is wished to obtain an oxide, a carbide or a nitride of actinide(s).

Thus:
 for the synthesis of oxides, the temperature is generally of the order of 600 to 800° C. and the atmosphere is an inert atmosphere, typically of nitrogen or argon, or oxidising, typically of air, according to the actinides considered;
 for the synthesis of carbides, the temperature is generally of the order of 1500 to 1800° C. and the atmosphere is an inert atmosphere, typically of nitrogen or argon, or reducing, typically a mixture of hydrogen and nitrogen or argon; whereas for the synthesis of nitrides, the temperature is generally of the order of 1500 to 1800° C. and the atmosphere is a reducing atmosphere, composed of nitrogen and hydrogen.

For the synthesis of carbides and nitrides, the source of carbon necessary for carbothermic reduction is either added to the aforementioned atmospheres, in which case it is typically methane, or present in the actinide(s) oxalate in molecular form.

According to the invention, the actinide(s) oxalate is advantageously a mixed oxalate, in which case it is, preferably, an oxalate of uranium(IV) and of plutonium(III), an oxalate of uranium(IV) and of americium(III), an oxalate of uranium(IV) and of curium(III), an oxalate of uranium(IV), of plutonium(III) and of neptunium(IV), an oxalate of uranium(IV), of plutonium(III) and of americium(III), an oxalate of uranium(IV), of americium(III) and of curium(III), an oxalate of uranium(IV), of plutonium(III), of americium(III) and of curium(III) or instead an oxalate of uranium(IV), of plutonium(III), of neptunium(V), of americium(III) and of curium(III), the calcination of which makes it possible to obtain respectively mixed oxides $(U,Pu)O_2$, $(U,Am)O_2$, $(U,Cm)O_2$, $(U,Pu,Np)O_2$, $(U,Pu,Am)O_2$, $(U,Am,Cm)O_2$, $(U,Pu,Am,Cm)O_2$ and $(U,Pu,Np,Am,Cm)O_2$.

In particular, it is a mixed oxalate of uranium(IV) and of plutonium(III), an oxalate of uranium(IV) and of americium (III) or of an oxalate of uranium(IV), of plutonium(III) and of americium(III).

Other characteristics and advantages of the invention will become clear on reading the remainder of the description that follows and which relates to two embodiment examples of the invention, one for the preparation of a neodymium(III) oxalate decahydrate and, from this, an neodymium oxide, and the other for the preparation of a mixed oxalate of uranium (IV) and cerium(III).

Obviously, these examples are only given by way of illustration of the object of the invention and do not constitute in any way a limitation of this object.

It should be noted that neodymium(III) and cerium(III) are not actinides but lanthanides which have chemical properties extremely similar to those of trivalent actinides (namely, plutonium(III), americium(III) and curium(III)), particularly in terms of solubility and complexation, but which, unlike the latter, are not radioactive.

It is thus conventional to use them instead of trivalent actinides in the elaboration of methods intended to be used on these actinides.

BRIEF DESCRIPTION OF DRAWINGS

FIG. 3A corresponds to a magnification of 1000 whereas FIG. 3B corresponds to a magnification of 500.

FIG. 4A corresponds to a magnification of 1000 whereas FIG. 4B correspond to a magnification of 500.

In FIGS. 1 and 6, identical references are used to designate identical components.

DETAILED DESCRIPTION OF SPECIFIC EMBODIMENTS

Example 1

Preparation of a Neodymium(III) oxalate Decahydrate and a Neodymium Oxide from Said Oxalate In this example, firstly a neodymium(III) oxalate decahydrate is prepared by bringing into contact, in a fluidised bed reactor, a 30 g/L aqueous solution of neodymium(III) nitrate, acidified between 0.5 and 2 moles/L by addition of nitric acid, with an aqueous solution comprising 0.7 mole/L of oxalic acid.

Figure 1:
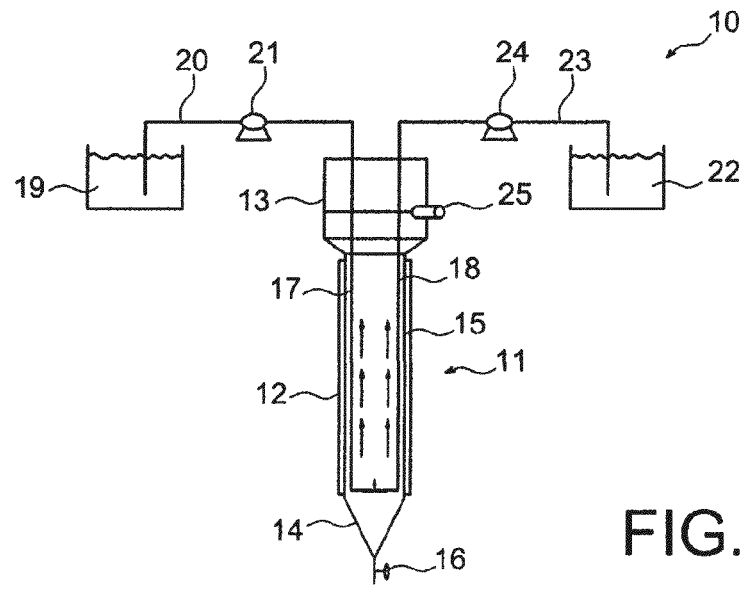
FIG. 1 is a diagram which represents an installation useful for the preparation of a neodymium(III) oxalate decahydrate according to the invention.

To do this, the installation 10, which is represented schematically in FIG. 1, is used.

This installation comprises, as essential component, a fluidised bed reactor 11 of vertical main axis, which is composed of three parts:

an intermediate part 12, which is allocated to the fluidisation of neodymium(III) oxalate decahydrate particles, which then form following the bringing into contact of the aqueous solutions of neodymium(III) nitrate and oxalic acid;

an upper part 13, which is allocated to the decantation of neodymium(III) oxalate decahydrate particles; and a lower part 14, which is allocated to the sedimentation of their particles and to their collection.

The intermediate part 12 of the reactor 11 is constituted of a cylinder, typically of circular straight section and with double walls 15, inside of which flows a thermo-fluid, for example water, making it possible to maintain the temperature reigning in this reactor constant. In this particular case, the temperature used is 25° C.

The upper part 13 is constituted of a cone frustrum, the small base of which originates at the upper end of the intermediate part 12 and the large base of which extends by a cylinder, typically of circular straight section like the intermediate part 12 but of diameter greater than that of said intermediate part 12. It is, furthermore, provided with an overflow 25 making it possible to eliminate from the reactor 11 the liquid phase, depleted in neodymium(III) nitrate and in oxalic acid, which results from the decantation of neodymium (III) oxalate decahydrate particles.

The lower part 14 is, for its part, constituted of a cone, the base of which originates at the lower end of the intermediate part 12 and the summit of which (which forms the lower end of the reactor 11) is provided with a system 16 of the tap, valve or analogous type, making it possible to collect, by decantations, the neodymium(III) oxalate decahydrate particles having sedimented.

The reagents, in other words the aqueous solution of neodymium(III) nitrate and the aqueous solution of oxalic acid, are introduced into the reactor 11, above the limit between the intermediate 12 and lower 14 parts of this reactor, by means of two injection pipes, respectively 17 and 18, which go down into the reactor 11 passing through its upper 13 and intermediate 12 parts.

The injection pipe 17 is connected to a reservoir 19 of aqueous solution of neodymium(III) nitrate via a pipe 20, which is provided with a pump 21 making it possible to regulate the feed rate of the reactor 11 via the injection pipe 17.

As for the injection pipe 18, it is connected to a reservoir 22 of aqueous solution of oxalic acid via a pipe 23, which is also provided with a pump 24 making it possible to regulate the feed rate of the reactor 11 via the injection pipe 18.

The feed rates of the reactor 11 via the injection pipes 17 and 18 are adjusted so as to obtain in this reactor an excess of oxalic acid compared to the stoichiometric conditions of the precipitation reaction of 0.05 to 0.2 mole/L.

The reactor 11, the reservoirs 19 and 22 and the pipes 20 and 23 are provided with different types of sensors (pH indicators, temperature indicators, flow rate indicators, etc.) which are not represented in FIG. 1 for reasons of clarity.

As may be seen in FIG. 1, the reactor 11 does not comprise an agitator, or recycling loop, the homogenisation of the mixture of reagents and the fluidisation of the neodymium (III) oxalate decahydrate particles being ensured uniquely by the feed rates of said reactor with these reagents.

The capacity of the intermediate part 12 of the reactor 11 is 1 liter.

After 4 hours of operating in continuous mode of the reactor 11, by carrying out decantations by means of the system 16 situated at its lower end, are collected particles of neodymium(III) oxalate decahydrate, which is filtered on a Buchner filter, then is washed and dried to obtain a powder.

Figure 2:
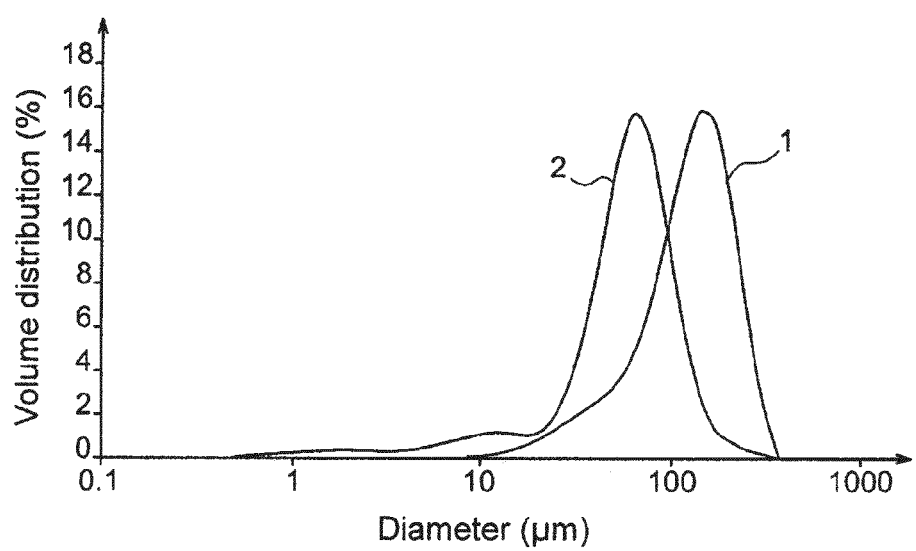
FIG. 2 is a graph which represents, in the form of curves, the volume size distribution of neodymium(III) oxalate decahydrate particles prepared according to the invention (curve 1) and, by way of comparison, that of neodymium(III) oxalate decahydrate particles obtained by precipitation in a Vortex effect reactor (curve 2); in this graph, are plotted, on the Y-axis, the volume frequency, expressed in percentages, of neodymium(III) oxalate decahydrate particles and, on the X-axis, the diameter, expressed in micrometers, of said particles.
Figure 3A:
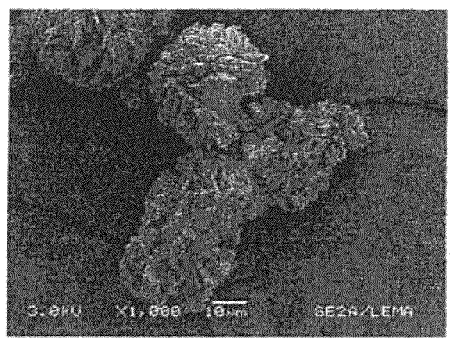
FIGS. 3A and 3B are two photographs taken with a scanning electron microscope of neodymium(III) oxalate decahydrate particles prepared according to the invention.
Figure 3B:
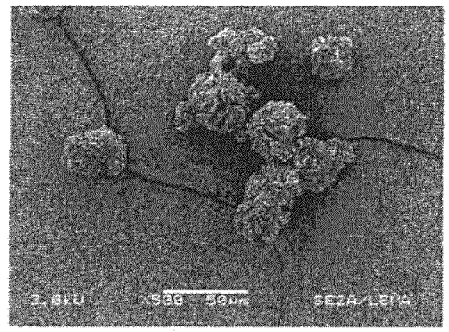
Figure 4A:
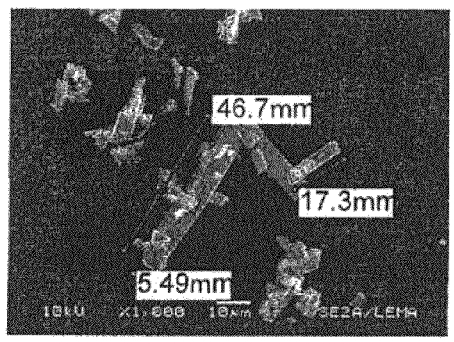
FIGS. 4A and 4B are two photographs taken with a scanning electron microscope of neodymium(III) oxalate decahydrate particles obtained by precipitation in a Vortex effect reactor.
Figure 4B:
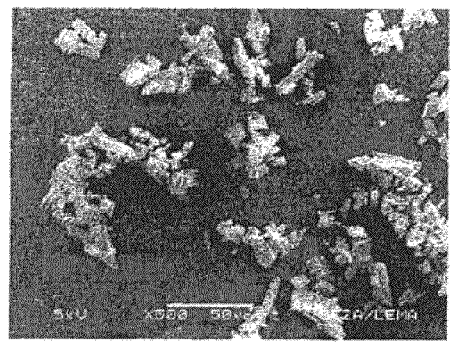

The volume size distribution (measured by means of a MALVERN Mastersizer® X model particle size analyser) of the particles constituting said powder (curve 1) as well as that of neodymium(III) oxalate decahydrate particles obtained by precipitation in a Vortex effect reactor (curve 2), using identical chemical conditions (same reagents, same initial concentrations, same acidity, same oxalic excess, same temperature) to those mentioned above, are represented in FIG. 2.

As may be seen in this figure, the curve corresponding to the neodymium oxalate particles prepared according to the invention is shifted towards the right of the graph, in other words towards higher particle diameters compared to that corresponding to the neodymium oxalate particles obtained in the Vortex effect reactor.

Thus, the diameter $D_{43}$ (average diameter) of neodymium oxalate particles prepared according to the invention is 161 µm whereas it is only 72 µm for the neodymium oxalate particles obtained in the Vortex effect reactor.

In addition, the neodymium oxalate prepared according to the invention does not comprise particles whose diameter is below 9 µm and has a diameter $D_{10}$ of 31 µm (which signifies that there are only 10% of particles of said oxalate that have a size below 31 µm), whereas the neodymium oxalate obtained in the Vortex effect reactor comprises 6% of particles, the diameter of which is below 10 µm and its diameter $D_{10}$ is 17 µm (which signifies that 10% of the particles of this oxalate have a size below 17 µm).

Furthermore, as shown in FIGS. 3A, 3B, 4A and 4B, which correspond to photographs taken with a scanning electron microscope of particles of these two types of oxalate, the neodymium oxalate particles prepared according to the invention (FIGS. 3A and 3B) have a spherical or quasi spherical morphology, with a volumic shape factor $\Phi_v$ of the order of 0.5, which is not the case of neodymium oxalate particles obtained in the Vortex effect reactor (FIGS. 4A and 4B) which, for their part, appear in the form of agglomerates of elongated sticks and are characterised by a shape factor $\Phi_v$ of the order of 0.02.

Furthermore, a neodymium oxide is prepared by calcinating under air, at 700° C. for 1 hour, the neodymium oxalate prepared according to the invention.

Figure 5:
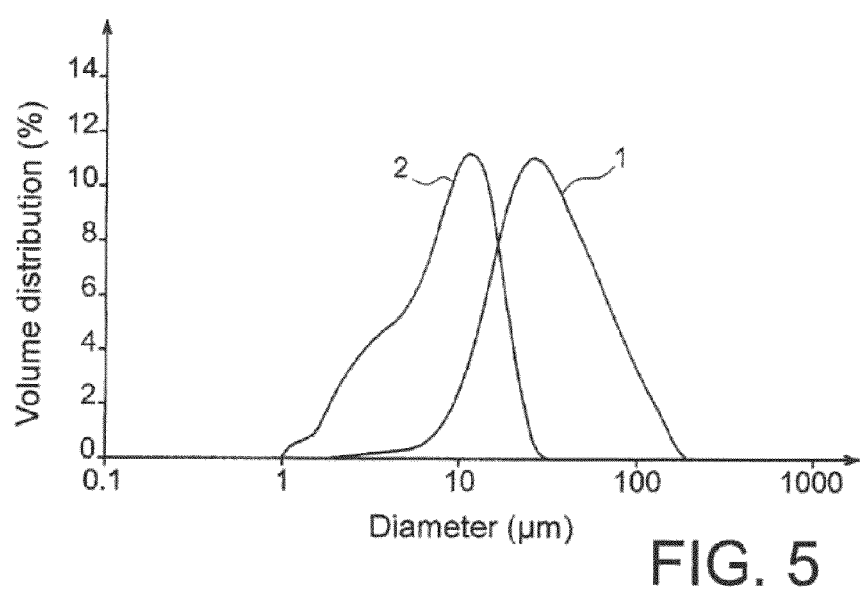
FIG. 5 is a graph which represents, in the form of curves, the volume size distribution of neodymium oxide particles obtained from a neodymium(III) oxalate decahydrate prepared according to the invention (curve 1) and, by way of comparison, that of neodymium oxide particles obtained from a neodymium(III) oxalate decahydrate prepared by precipitation in a Vortex effect reactor (curve 2); in this graph, are plotted, on the Y-axis, the volume frequency, expressed in percentages, of neodymium oxide particles and, on the X-axis, the diameter, expressed in micrometers, of said particles.

The volume size distribution (measured by means of a MALVERN Mastersizer® X model particle size analyser) of the particles constituting said oxide (curve 1) as well as that of neodymium oxide particles obtained by calcinating, under the same conditions, a neodymium(III) oxalate decahydrate prepared by precipitation in a Vortex effect reactor (curve 2) are represented in FIG. 5.

This figure shows that the improvement in the granulometric characteristics of an oxalate is found in the oxide obtained from this oxalate since the diameters $D_{43}$ (average diameter) and $D_{10}$ of particles of the oxide obtained by calcination of the neodymium oxalate prepared according to the invention are respectively 46 µm and 15.5 µm, whereas they are only 12.7 µm and 2.1 µm for the oxide particles obtained by calcination of the neodymium oxalate prepared by precipitation in a Vortex effect reactor.

Example 2

Preparation of a Mixed Oxalate of Uranium(IV) and of Cerium(III)

A mixed oxalate of uranium(IV) and of cerium(III) is prepared by bringing into contact, in a fluidised bed reactor, an aqueous solution with 20 g/L of uranyl nitrate and with 10 g/L of cerium(III) nitrate, acidified between 0.5 and 2 moles/L by addition of nitric acid, with a 0.7 mole/L aqueous solution of oxalic acid.

Figure 6:
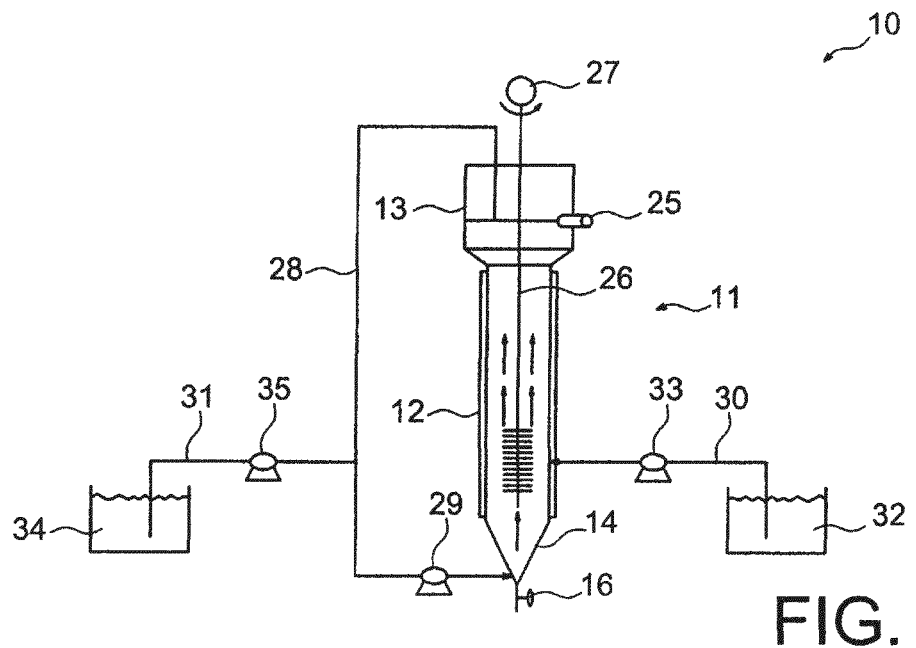
FIG. 6 is a diagram that represents an installation useful for the preparation of a mixed oxalate of uranium(IV) and of cerium(III) according to the invention.

To do this, the installation 10, which is represented schematically in FIG. 6, is used.

This installation is substantially identical to that represented in FIG. 1 as regards the fluidised bed reactor 11.

On the other hand, it differs from it by the fact that the intermediate part 12 of the reactor 11 is provided with a stirrer 26, for example with blades, which is driven in rotation by a motor 27, for example at a speed of 20 rpm, and which is intended to facilitate the homogenisation of the mixture of reagents that are introduced into the reactor.

It also differs from it by the fact that the reactor 11 is equipped with a recycling loop 28, in other words a pipe that originates in the upper part 13 of said reactor, substantially at the level of the overflow 25, and ends in its lower part 14, near to the decantation system 16, and the flow rate of which is regulated by a pump 29, for example of peristaltic type. This recycling loop makes it possible to maintain the fluidisation and to withdraw the fine particles of mixed oxalate of uranium (IV) and of cerium(III) present in the upper part 13 of the reactor 11 and to re-inject said particles into the lower part 14 of said reactor.

Moreover, it differs from it by the fact that the supply of the reactor 11 with reagents is not ensured by injection pipes but by two pipes, respectively 30 and 31, one of which joins up with said reactor whereas the other joins up with the recycling loop 28.

The pipe 30 is connected to a reservoir 32 of aqueous solution of uranyl and cerium(III) nitrates and is provided with a pump 33 making it possible to regulate the feed rate of the reactor 11 via the pipe 30.

In a similar manner, the pipe 31 is connected to a reservoir 34 of aqueous solution of oxalic acid and is provided with a pump 35 making it possible to regulate the supply of the recycling loop 28 via the pipe 31.

The feed rates of the reactor 11 via the pipe 30 and the recycling loop via the pipe 31 are adjusted so as to obtain in this reactor an excess of oxalic acid compared to the stoichiometric conditions of the precipitation reaction of 0.05 to 0.2 mole/L.

The capacity of the intermediate part 12 of the reactor 11 is, furthermore, much greater than that of the reactor 11 of the installation shown in FIG. 1, since it is 80 liters.

The temperature that reigns in the reactor 11 is 25° C.

After 80 hours of operation in continuous mode of the reactor 11, by carrying out decantations by means of the system 16 situated at its lower end, particles are collected of a mixed oxalate of uranium(IV) and of cerium(III), which is filtered on a Buchner filter, then is washed and dried to obtain a powder.

Figure 7:
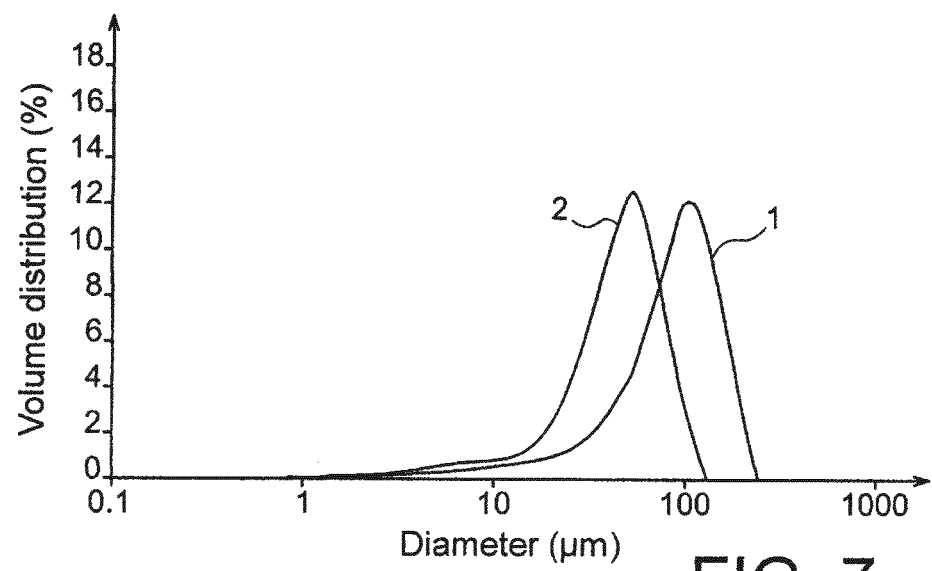
FIG. 7 is a graph which represents, in the form of curves, the volume size distribution of particles of mixed oxalate of uranium(IV) and of cerium(III) prepared according to the invention (curve 1) and, by way of comparison, that of particles of mixed oxalate of uranium(IV) and of cerium(III) obtained by precipitation in a Vortex effect reactor (curve 2); in this graph are plotted, on the Y-axis, the volume frequency, expressed in percentages, of particles of mixed oxalate of uranium(IV) and of cerium(III) and, on the X-axis, the diameter, expressed in micrometers, of said particles.

The volume size distribution (measured by means of a MALVERN Mastersizer® X model particle size analyser) of the particles constituting said powder (curve 1) as well as that of the particles of a mixed oxalate of uranium(IV) and of cerium(III) prepared by precipitation in a Vortex effect reactor (curve 2), using the same reagents and the same flow rates as those mentioned above, are represented, in the form of curves, in FIG. 7.

As shown in this figure, the curve corresponding to the particles of the mixed oxalate of uranium and of cerium prepared according to the invention is, once again, shifted towards the right of the graph, in other words towards particles of higher diameter, compared to that corresponding to the particles of the mixed oxalate of uranium and of cerium obtained by precipitation in the Vortex effect reactor.

The diameter $D_{43}$ (average diameter) of the particles of the mixed oxalate of uranium and of cerium prepared according to the invention is 90 µm, whereas it is only 45 µm for the particles of the mixed oxalate of uranium and of cerium obtained in the Vortex effect reactor.

In addition, the diameter $D_{10}$ of the particles of the mixed oxalate of uranium and of cerium prepared according to the invention is of the order of 25 µm (which signifies that there is only 10% of particles of this oxalate that have a size below 25 µm) whereas the diameter $D_{10}$ of particles of the mixed oxalate of uranium and of cerium obtained in the Vortex effect reactor is 9 µm (which signifies that 10% of particles of this oxalate have a size below 9 µm).

REFERENCES CITED

[1] Van Ammers et al. 1986, Wat. Supply, 4, pp 223-235
[2] Schöller et al. 1987, Proceedings of the Second Conference on Environmental Technology, Production and the Environment, pp 294-303
[3] Nielsen et al. 1997, Water Sci. Techno., 36, pp 391-397
[4] Zhou et al. 1999, Water Research, 33(8), pp 1918-1924
[5] Seckler et al. 1996, Water Research, 30(7), pp 1585-1596
[6] Frances et al. 1994, Chemical Engineering Science, 49(19), pp 3269-3276
[7] International patent application PCT WO 2005/119699

The invention claimed is:

1. A method for preparing particles of an oxalate of one or more actinides, comprising:
    precipitating the actinide(s) in a form of actinide(s) oxalate particles in a fluidized bed reactor by bringing a first aqueous solution comprising the actinide(s) into contact with a second aqueous solution of oxalic acid or of an oxalic acid salt in the fluidized bed reactor, and forming the actinide(s) oxalate particles having a spherical or quasi-spherical shape, and
    collecting the so precipitated actinide(s) oxalate particles.

2. The method of claim 1, in which the first aqueous solution has a total concentration of actinide(s) of 0.01 to 300 g/L.

3. The method of claim 1, in which the second aqueous solution has a concentration of oxalic acid or oxalic acid salt of 0.05 to 1 mole/L.

4. The method of claim 2, in which the volume ratio of the first aqueous solution to the second aqueous solution is such that the oxalic acid or the oxalic acid salt is in excess compared to an amount of oxalic acid or oxalic acid salt required for precipitating the actinide(s) in stoichiometric conditions, the excess being from 0.01 to 0.5 mole/L.

5. The method of claim 1, in which the actinide(s) is (are) present in the first aqueous solution in a form of nitrate(s).

6. The method of claim 1, in which the first aqueous solution is an acid solution.

7. The method of claim 6, in which the first aqueous solution is an aqueous solution comprising from 0.1 to 4 moles/L of nitric acid.

8. The method of claim 1, in which at least one of the first and second aqueous solutions further comprises a monocharged cation constituted of atoms of oxygen, carbon, nitrogen and hydrogen.

9. The method of claim 8, in which the monocharged cation is a hydrazinium ion and is present in the first aqueous solution in a form of hydrazinium nitrate.

10. The method of claim 1, in which precipitating the actinide(s) oxalate particles comprises fluidizing, decanting and sedimenting the actinide(s) oxalate particles and the fluidized bed reactor has a vertical main axis and comprises:
    an intermediate part in which the actinide(s) oxalate particles are fluidized;
    an upper part in which the actinide(s) oxalate particles are decanted; and
    a lower part in which the actinide(s) oxalate particles are sedimented.

11. The method of claim 10, in which precipitating the actinide(s) oxaloate particles comprises:
    fluidizing the actinide(s) oxalate particles by introducing the first and second solutions into the fluidized bed reactor, at least one of the first and second solutions being introduced into the lower part of the fluidized bed reactor to create an ascending current of liquid and thereby to form a fluidized bed of actinide(s) oxalate particles in the intermediate part of the fluidized bed reactor;

decanting the actinide(s) oxalate particles in the upper part of the fluidized bed reactor to form two phases, a solid phase constituted of the actinide(s) oxalate particles and a liquid phase resulting from a mixing and a depletion into actinide(s) and into oxalic acid or oxalic acid salt of the first and second aqueous solutions;

sedimenting the actinide(s) oxalate particles in the lower part of the fluidized bed reactor; and withdrawing the actinide(s) oxalate particles measuring less than 10 μm which are in the upper part of the fluidized bed reactor and transferring said particles into the lower part of the fluidized bed reactor.

12. The method of claim 1, in which the actinide(s) is (are) chosen from uranium, plutonium, neptunium, thorium, americium and curium.

13. The method of claim 1, in which the actinide(s) oxalate is an oxalate of uranium(IV) and plutonium(III), an oxalate of uranium(IV) and americium(III), an oxalate of uranium(IV) and curium(III), an oxalate of uranium(IV), plutonium(III) and neptunium(IV), an oxalate of uranium(IV), plutonium (III) and americium(III), an oxalate of uranium(IV), americium(III) and curium(III), an oxalate of uranium(IV), plutonium(III), americium(III) and curium(III), or an oxalate of uranium(IV), plutonium(III), neptunium(IV), americium(III) and curium(III).

14. A method for preparing a compound chosen from oxides, carbides and nitrides of one or more actinides, which comprises:

preparing particles of an oxalate of one or more actinides by a method according to claim 1; and calcining the actinide(s) oxalate particles.

15. The method of claim 14, in which the actinide(s) oxalate is an oxalate of uranium(IV) and plutonium(III), an oxalate of uranium(IV) and americium(III), an oxalate of uranium(IV) and curium(III), an oxalate of uranium(IV), plutonium(III) and neptunium(IV), an oxalate of uranium(IV), plutonium(III) and americium(III), an oxalate of uranium (IV), americium(III) and curium(III), an oxalate of uranium (IV), plutonium(III), americium(III) and curium(III), or an oxalate of uranium(IV), plutonium(III), neptunium(V), americium(III) and curium(III).

16. The method of claim 14, in which the compound is an oxide of uranium and plutonium, an oxide of uranium and americium, an oxide of uranium(IV) and curium(III), an oxide of uranium, plutonium and neptunium, an oxide of uranium, plutonium and americium, an oxide of uranium, americium and curium, an oxide of uranium, plutonium, americium and curium, or an oxide of uranium, plutonium, neptunium, americium and curium.

* * * * *